Patented Jan. 16, 1945

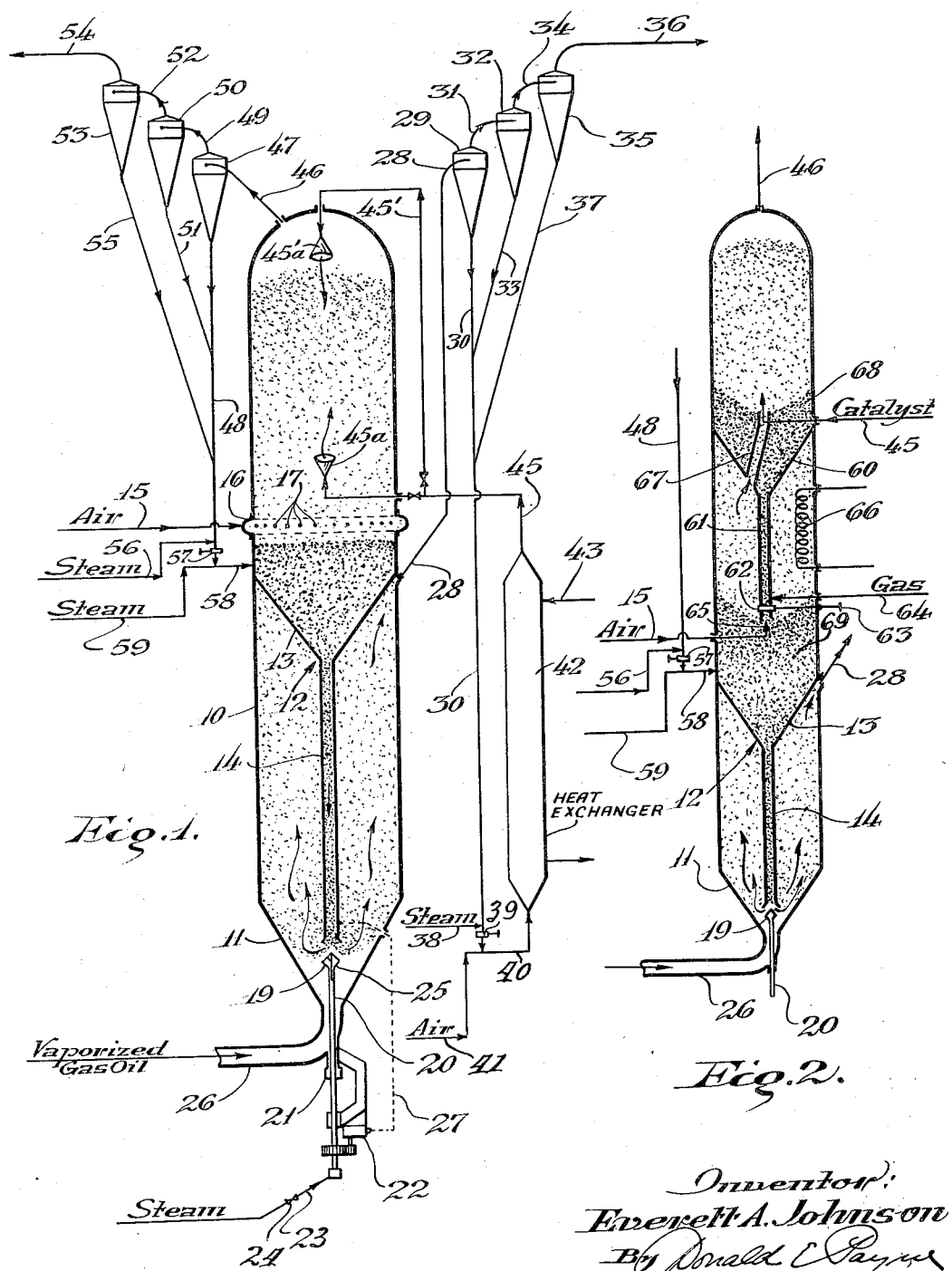

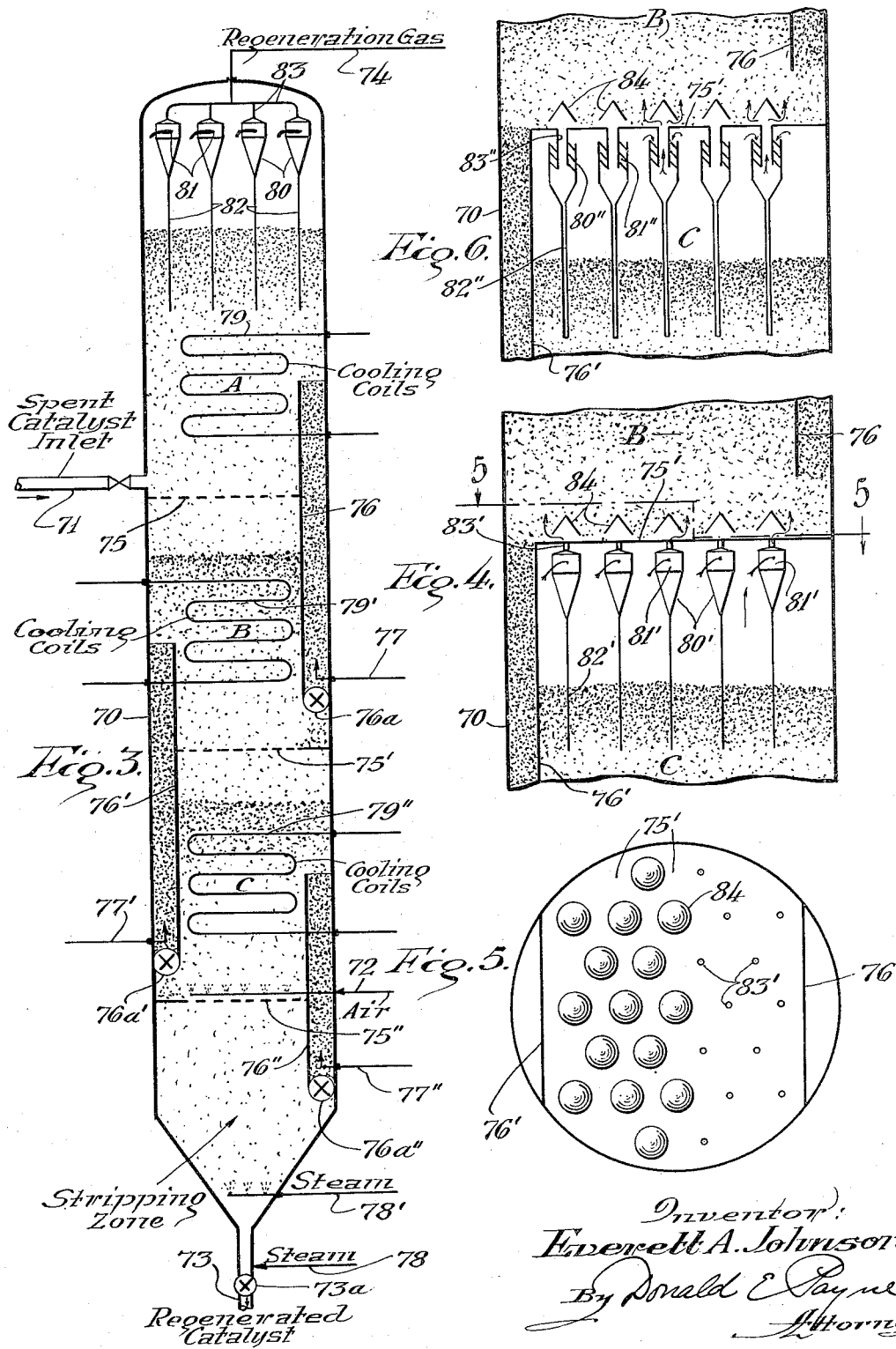

2,367,281

UNITED STATES PATENT OFFICE 2,367,281

CATALYTIC CONVERSION SYSTEM

Everett A. Johnson, Park Ridge, Ill., assignor to Standard Oil Company, Chicago, Ill., a corporation of Indiana Application September 30, 1941, Serial No. 412,935

22 Claims. (Cl. 196—52)

This invention relates to a catalytic conversion system and it pertains more particularly to a system for handling finely divided or powdered catalyst which is alternately on-stream and undergoing regeneration. This application is a continuation-in-part of my copending application entitled "Catalytic conversion system," Serial No. 392,847, filed May 10, 1941.

The invention will be described as applied to a process for cracking gas oil or heavier hydrocarbons for the production of high quality motor fuel and it should be understood that the invention is applicable to other hydrocarbon conversion processes and, in fact, to any conversion process wherein a powdered catalyst promotes a reaction while suspended in gases or vapors. The invention may advantageously be applied to the process of catalytically reforming or dehydroaromatizing virgin naphtha for converting it into high quality motor fuels and for the production of aromatics such as benzol and toluene.

After the catalytic conversion step the catalyst is separated from reaction products and regenerated while suspended in a regeneration gas. The means for regenerating catalyst is, of course, an integral part of the catalytic conversion system and my invention relates particularly to new and improved methods and means for regenerating spent catalyst. After regeneration, the catalyst is separated from regeneration gas and returned to the conversion step.

An object of my invention is to provide an improved method and means for accomplishing a countercurrent contacting of powdered catalyst with reaction gases or vapors or with regeneration gases. In conversion steps my object is to provide a method and means for initially contacting the catalyst with gases or vapors which have already been partially converted so that the final conversion step is effected with relatively fresh catalyst. In the regeneration step my object is to contact the catalyst initially with regeneration gases of dilute oxygen concentration and finally contacting the partially regenerated catalyst with regeneration gases of high oxygen concentration. My object is to provide more effective and more complete utilization of the catalyst in on-stream conversion steps and a more complete regeneration of the catalyst than has been possible in previous systems.

A further object of my invention is to provide improved methods and means for handling powdered catalyst in conversion or regeneration systems. A further object is to utilize certain engineering principles for the handling of powdered solids which principles have heretofore only been applicable for the handling of gases, vapors and liquids. Other objects will be apparent as the detailed description of the invention proceeds.

In practicing my invention I employ a vertical tower with one or more partitions for separating said tower into a plurality of sections. Powdered catalyst is continuously introduced into the upper section and maintained in dense turbulent suspended catalyst phase therein for a sufficient period of time to accomplish the desired conversion or regeneration. The powdered catalyst is settled and withdrawn from this dense turbulent suspended catalyst phase at substantially the same rate at which it is introduced thereto and it is allowed to flow by gravity into a lower section in said tower wherein it is resuspended in another dense turbulent suspended catalyst phase. The catalyst thus passes from zone to zone in the tower while in dense aerated condition and in each zone it is resuspended as a dense turbulent suspended catalyst phase.

I may effect regeneration in one or more upper zones and conversion in one or more lower zones in the tower or vice versa. When a plurality of zones are employed for countercurrent regeneration the catalyst in the upper part of the regenerator is maintained in a dense turbulent suspension in hot regeneration gas or relatively low oxygen concentration. In the lower part of the regenerator or in the lower regeneration zone the partially regenerated catalyst is maintained in a dense turbulent suspension in a regeneration gas of high oxygen concentration. The catalyst is thus more completely regenerated than has been possible in previous systems of this type.

Temperature control in the regeneration zones may be effected by cooling the catalyst introduced into said zones, or abstracting heat from the dense turbulent suspended catalyst phase in the zone itself or by employing a sufficient amount of relatively cool air or other regeneration gas to absorb the heat of regeneration without reaching excessively high temperatures.

An important feature of the invention is the savings in construction and operating costs which are obtainable by a more effective utilization of pressures in the various parts of the system and the avoidance of the unduly long standpipes that have heretofore been required. An important feature of the invention is the separation of catalyst from each zone by simple settling instead of by expensive and cumbersome centrifugal separation means. Centrifugal separators may be employed for removing the very small amount of catalyst which might leave each zone with gases or vapors, but the use of centrifugal separators for knocking back catalyst from such gases or vapors is not always essential. A feature of my invention is the simplicity of construction and operation of centrifugal separation employed for knockback purposes.

The invention will be more clearly understood from the following detailed description and from the accompanying drawings which form a part of this specification and in which Figure 1 is a schematic vertical section of one embodiment of my uniform reaction-regeneration system;

Figure 2 is a schematic vertical section through a modified form of the system for obtaining more efficient countercurrent regeneration;

Figure 3 is a schematic vertical section through another modification of a countercurrent tower which may be employed for either on-stream reaction or catalyst regeneration;

Figure 4 is a detailed vertical section illustrating the use of Buell type knock-back cyclone separators between adjacent zones or stages in the tower;

Figure 5 is a horizontal section taken along the lines 5—5 of Figure 4 and

Figure 6 is a detailed vertical section illustrating the use of multi-cone knock-back centrifugal separators between adjacent stages or zones in the tower.

When the invention is applied to the catalytic cracking of gas oil or heavier hydrocarbon charging stocks the catalyst is preferably of the silica-alumina or silica-magnesia type. An example of the silica-alumina catalyst is acid treated bentonite of the kind commonly marketed as Super Filtrol. An excellent catalyst may be synthetically prepared by ball-milling silica hydrogel with alumina or magnesia using about 2 to 30%, for example about 15 or 20%, of alumina or magnesia. The ball-milled dough may be dried at a temperature of about 240° F. and then activated by heating to a temperature of about 900 to 1000° F. Another method of preparing a highly active cracking catalyst is to form a gel from dilute sodium silicate in the presence of an aluminum salt by the addition of excess dilute sulfuric acid. The resulting gel is preferably boiled for an hour or two with an excess of dilute ammonium hydroxide solution before washing after which it is dried and heated as in the previous example. The silica-alumina catalyst may be rendered more stable at high temperatures by the addition thereto of zirconium. The ball-milled silica-magnesia catalyst may be improved by preheating the magnesia with a thorium nitrate solution so that the finished catalyst may, for instance, have the following composition:

| | Percent |
|---|---|
| Silica | 66 |
| Magnesia | 27 |
| Thoria | 7 |

No invention is claimed in the cracking catalyst per se and no further description of the catalyst is therefore necessary.

The catalyst in this specific example is in powdered form with a particle size of about 10 to 100 microns. The invention is applicable to other catalyst sizes provided only that the catalyst be of such size and density that it may be aerated and handled as a fluid in the manner herein described. Higher gas or vapor velocity may be required for coarser catalyst particles.

The density of the catalyst particles per se may be as high as 160 pounds per cubic foot but the bulk density of catalyst which has settled for 5 or 10 minutes will usually be from 25 to 40 pounds per cubic foot. With slight aeration, i. e., with vapor velocities of about .05 to .5 feet per second the bulk density of the 10 to 100 micron catalyst will be about 20 to 30 pounds per cubic foot. With gas or vapor velocities of about 1 to 4, preferably about 2 or 2½ feet per second, the bulk density of such catalyst may be about 10 to 20 pounds, for example, about 15 to 18 pounds per cubic foot and it is at such gas or vapor velocity and at such catalyst densities that the catalyst is maintained in the dense turbulent suspended catalyst phase. At higher gas or vapor velocities the catalyst is suspended as a dilute catalyst phase of which the density may be as high as 3 or 4 pounds per cubic foot but is usually considerably less than 1 pound per cubic foot.

Referring specifically to Figure 1, tower 10 may be about 90 to 100 feet high and about 25 feet or more in diameter. This tower is provided with a cone-shaped bottom 11. About 25 or 30 feet from the tower bottom a funnel-shaped partition 12 is provided, the conical upper walls 13 of which are securely welded to the walls of tower 10 and the tubular center section 14 of which extends to a point adjacent the lower part of cone-shaped bottom 11. The space within the tower which surrounds pipe 14 between cone-shaped members 11 and 13 constitutes the reaction section or the reactor in which hydrocarbon conversion is effected.

About half way up the tower and in the upper section thereof, I provide means for introducing air for effecting catalyst regeneration. The air may be introduced through line 15 into a tube ring or tuyère 16 which may surround the tower wall and which may be provided with orifices or branch lines 17 for directing the introduced air horizontally into the tower so that immediately above the plane of this tube ring or tuyère there will be a sheet or blanket of upwardly moving air. The catalyst, which is regenerated for the most part in the upper part of the regenerator, must settle downwardly through this blanket of high oxygen concentration. Since the catalyst is at a temperature of about 1000° F. and is already substantially freed from carbonaceous deposit, combustion of any remaining carbonaceous material from the catalyst in this intermediate zone will take place before the catalyst reaches the bottom of the regenerator section.

The catalyst which thus settles to cone-shaped bottom 13 flows downwardly through pipe 14 and may be admitted into the reactor section of the tower in amounts regulated by valve closure 19 which is mounted on hollow stem 20 extending through stuffing box 21 to external operating means 22. Steam may be introduced through line 23 in amounts regulated by valve 24 and discharged through ports 25 at the upper part of closure member 19. When valve 19 is closed the introduced steam aerates the catalyst in pipe 14 and aerates catalyst in the space above cone-shaped member 13 although additional aerating gas may be introduced into this enlarged catalyst storage section of the tower for effecting desired aeration and stripping. When valve 19 is open the steam introduced through line 23 and ports 25 disperses catalyst into the reaction space.

The gas oil charging stock is vaporized in a conventional pipe still (not shown) and introduced at the base of the reactor through line 26 at a temperature of about 850 to 1000° F., for example about 900 to 925° F., and at a gauge pressure of about atmospheric to about 25 pounds per square inch, for example about 13 pounds per square inch. Regenerated catalyst in the lower part of pipe 14 may be at a pressure of about 20 pounds per square inch so that this catalyst will flow downwardly and into the reactor in amounts regulated by valve closure member 19. The weigh ratio of catalyst so introduced to oil introduced may be about 1:1 to 10:1 or more, for example about 4:1. The catalyst may be at a temperature of about 950 to 1000° F., for example about 975° F.

The catalyst may be dispersed into the incoming vapors by steam introduced through line 23 and ports 25. It will thus be seen that in view of pressure differentials, reaction vapors will be prevented from entering pipe 14. My invention is not limited to the use of any particular type of valve or aeration means at the base of pipe 14 and it should be understood that I may employ any desired type of valve mechanism, star feeder or the like. It is important, however, to insure against the passage of reaction vapors into pipe 14 and I, therefore, prefer to provide automatic means indicated by dotted line 27 for tightly closing the bottom of pipe 14 when the pressure in the bottom of this pipe is not at least one or two pounds higher than the pressure in the bottom of the reactor.

The upward vertical velocity of charging stock vapors and steam in the reactor may be from about 1 to 3 feet per second, preferably 1½ to 2 feet per second. This provides for a dense catalyst phase in the reactor and for a vapor contact time of about 10 to 15 seconds. A uniform temperature of about 925° F. prevails throughout the entire reactor.

Reaction products may leave the top of the reactor at a pressure of about 9 pounds per square inch through line 28 carrying suspended catalyst out of the reactor at substantially the same rate as regenerated catalyst is introduced thereto. Line 28 leads to a primary separation zone 29 which may be a cyclone separator or an enlarged settling chamber or a combination of settling chamber and cyclone separator. This separator may be superimposed on the top of tower 10 or along side of the tower and the pressure in this primary separator may be about 6 to 8 pounds per square inch depending upon the length and size of line 28. In the drawings I have illustrated a cyclone separator 29 operating at the pressure of about 6½ pounds per square inch and discharging spent catalyst into the top of standpipe 30 which may be about 70 or 80 feet high.

Vapors from the primary separator are introduced by line 31 to secondary cyclone separator 32 which is at a sufficiently higher elevation than the primary cyclone so that the head of separated catalyst in pipe 33, which discharges into standpipe 30, will compensate for the lower pressure in separator 32, which may operate at about 6 pounds per square inch. Vapors from separator 32 are introduced by line 34 to tertiary cyclone 35 which is preferably at a still higher elevation and which may operate at about 5½ pounds per square inch so that the final vapors may be introduced by line 36 into a fractionation system at a pressure of about 5 pounds gauge. Separated catalyst from cyclone 35 is returned by line 37 to standpipe 30.

Any type of fractionation system may be employed for removing gas oil, gasoline and gas fractions, scrubbing the last traces of catalyst out of the reaction products, removing the condensed water, etc. Since this fractionation system forms no part of my present invention it will not be described in further detail.

Standpipe 30 is aerated by steam introduced through line 38 and if desired additional aeration or stripping steam may be employed in primary separator 29. The pressure at the base of standpipe 30 may be about 18 or 20 pounds per square inch. Catalyst from the base of this standpipe is introduced in amounts regulated by valve or star feeder 39 into pipe 40 in which it is suspended in air or other carrier gas introduced through line 41 at a pressure of about 14 or 15 pounds per square inch. The spent catalyst is then passed upwardly through the tubes of heat exchanger 42 wherein it may be cooled to a temperature of about 400 to 850° F. depending upon the amount of carbonaceous material which must be burned therefrom in the regenerator. A cooling fluid may be introduced into the cooler at 43 and withdrawn through line 44. Thus for example, water may be introduced and steam may be generated at desired pressure in this exchanger. The cooled catalyst is then passed by line 45 into the regenerator section of the tower at a point above the air inlet tuyère 16.

Sufficient air is introduced into the regeneration system through line 15, tuyère 16 and orifices 17 to provide an upward gas velocity between the tuyère and the point of catalyst inlet of about .5 to 2, for example about 1 to 1½ feet per second. The catalyst may be introduced through line 45 and dispersed in the upper part of the regenerator by means of conical distributor 45a. Alternatively, it may be carried to the top of the tower through line 45' and introduced through distributor 45a'. In either case the catalyst in the upper part of the tower is suspended and maintained in turbulent condition for a sufficient period of time to effect the combustion of most of the carbonaceous deposits therefrom. A substantially uniform temperature of about 1000 degrees prevails throughout the entire regeneration tower and the introduced catalyst is almost instantaneously dispersed through the entire upper part of the regeneration zone. The point of catalyst introduction may be near air distributors 17 but I prefer to introduce the catalyst at a point about one-third the distance from air distributors to the top of the tower. At this point of catalyst introduction the pressure in the tower may be about 11 or 12 pounds per square inch.

It should be noted that while most of the carbonaceous material is burned from the catalyst in the dense turbulent zone in the upper part of the tower, the final combustion of carbonaceous material which settles out in the regenerator is effected in the zone where substantially pure air is introduced. In other words, I obtain a countercurrent effect whereby the bulk of the deposits are burned with a gas of relatively small oxygen content but wherein the catalyst passes through a blanket of gas of high oxygen content before it reaches the base of the regenerator. As soon as the catalyst particles pass air inlets 17 any residual oxygen containing gas is removed therefrom by the stripping gases passing upwardly through pipe 14 or directly introduced into the body of catalyst which is above cone-shaped bottom 13. The pressure in the regenerator at the point of air inlet may be about 12 or 13 pounds per square inch. The pressure at the bottom of cone bottom 13 may be about 16 pounds per square inch. The pressure at the top of the regenerator may be about 9 pounds per square inch.

Some catalyst may be carried overhead with regeneration gases through line 46 to primary cyclone separator 47 which may operate at about 8½ pounds pressure and may be provided with a dip leg or standpipe 48 about 40 or 50 feet long. Gases from the primary cyclone may be introduced through line 49 to secondary cyclone 50 at a pressure of about 8 pounds, this secondary cyclone being at a higher elevation than the primary cyclone so that its dip leg 51, which discharges into standpipe 48, will be long enough to provide the necessary head of catalyst for balancing the pressure differential. Gases from secondary cyclone 50 may be passed by line 52 to tertiary cyclone 53 which may operate at about 7½ pounds pressure and from which the regeneration gases may be taken through line 54 to a suitable heat exchanger and Cottrell precipitator for recovering the final traces of catalyst. Tertiary cyclone 53 is at a higher elevation than secondary cyclone 50 and dip leg 55 returns the catalyst from the tertiary cyclone to standpipe 48.

Standpipe 48 may be aerated by steam introduced through line 56. The catalyst in the base of this standpipe may be at a pressure of about 16 to 17 pounds per square inch. This catalyst may be discharged through valve or star feeder 57 and introduced by line 58 at a point below the air inlets by means of steam introduced through line 59 at a pressure of about 14 or 15 pounds per square inch.

It should be understood, of course, that instead of mounting cyclones 47, 50 and 53 outside of the regenerator these cyclones may be positioned inside of the regenerator and at the top thereof. In this case the cyclone dip legs will simply extend into the settled catalyst below the point of air inlet and since the density of separated catalyst in the dip legs will be greater than the density of the turbulent catalyst suspension in the upper part of the regeneration tower the catalyst will flow downwardly in the dip legs and the head of catalyst in the dip legs will balance the difference between the pressure in the cyclones and the pressure in the regenerator respectively. Similarly, cyclones 29, 32 and 35 may be mounted in an enlarged separator superimposed above tower 10.

Instead of employing standpipe 30 and cooler 42 I may reintroduce a spent catalyst directly from the upper separation means into the regenerator and control the temperature in the regenerator by means of cooling coils. Catalyst from the reactor may likewise be removed from the base thereof in the same way that catalyst is removed from the base of the regenerator.

In Figure 2 I have illustrated a system for obtaining more effective countercurrent regeneration of the catalyst before it is returned to the reactor. In this modification a funnel-shaped separator is provided in the lower part of the regenerator. The cone-shaped top 60 of this separator is welded to tower 10 at its outer edge and this cone-shaped member forms the base of the upper regeneration zone. A standpipe 61 depends from the center of this cone-shaped member 60. Flow of catalyst through this central tube or standpipe is regulated by slide valve or other suitable means 62 externally operated by manual or automatic control means 63. Aeration may be effected in this standpipe by means of steam or air introduced through line 64.

In this case the primary regeneration air from line 15 is directed upwardly by cone-shaped distributor 65 for dispersing catalyst into the space between standpipe 61 and the tower coils. With a vertical gas velocity in this space of about 1 to 2 feet per second there will be a dense turbulent phase of suspended catalyst in this space. If the amount of carbonaceous material which is removed from the catalyst in this space is sufficient to cause unduly high temperatures, I may employ suitable cooling coils 66 for removing heat of combustion or I may recycle catalyst from this zone through an external cooler and then introduce the catalyst back to the zone for maintaining temperature.

Gases from the upper part of this lower regeneration zone are withdrawn through relatively large conduit 67 and are employed for dispersing catalyst introduced through line 45 into the upper regeneration zone where the bulk of the regeneration is effected. Here again regeneration is effected, while the catalyst is suspended in a dense turbulent phase which is maintained by keeping the vertical gas velocities at about 1½ to 3 feet per second.

Catalyst settles from the dense turbulent phase in the upper zone into a relatively dense layer 68 which is maintained in fluent form by aeration gas introduced through line 64 and if desired or necessary by additional aeration gas introduced above cone-shaped member 60. This fluent dense catalyst flows downwardly through standpipe 61 and is dispersed in primary regeneration air in the lower regeneration zone. Regenerated catalyst settles out of the lower regeneration zone to form a relatively dense fluent layer 69 which is aerated and stripped by steam introduced by line 23 and by additional steam introduced above cone-shaped member 13. This regenerated catalyst then flows through pipe 14 to the reactor as hereinabove described.

While vertical gas velocities have been described for a particular catalyst in a particular unit it should be understood that these gas velocities may vary with other catalysts and with other structural designs. Also, it should be understood that I may employ any number of regeneration zones of the type illustrated in Figure 2. If the amount of air introduced into the upper zone with the spent catalyst causes unduly high gas velocities in said upper zone I may enlarge the diameter of the tower at this point so that the vertical gas velocities will be in all cases critically adjusted so as to maintain the dense turbulent catalyst suspension that is desired for effective regeneration.

The invention is not limited to cone-shaped partitions for dividing the tower into separate zones nor is it limited to the specific catalyst handling means illustrated in Figures 1 and 2. In Figure 3 I have illustrated a multi-zone tower 70 for effecting conversion or regeneration wherein perforated partitions are employed and wherein the catalyst is transferred from zone to zone through laterally arranged "downcomer" conduits. When tower 70 is employed for catalyst regeneration, the spent catalyst is introduced through conduit 71 to the upper zone, air is introduced through line 72 into a lower zone, regenerated catalyst is withdrawn from the bottom of the tower through conduit or standpipe 73 and regeneration gases are withdrawn from the top of the tower through line 74. A perforated partition 75 separates the top zone A from the adjacent lower zone B, perforated partition 75' separates this lower zone B from the next lower zone C and perforated partition wall 75'' separates the last-named zone C from the bottom or stripping zone in the tower. Partially regenerated catalyst flows from the zone A to zone B through downcomer conduit 76 which may be provided with a suitable valve 76a for regulating the flow therein and with suitable aerating means 77 immediately above the valve for maintaining the catalyst in aerated condition in its downward flow. Similarly, catalyst leaves zone B and is transferred to zone C through downcomer conduit 76' which is provided with a valve 76a' for regulating catalyst flow and with aeration means 77' for maintaining the catalyst in aerated condition. The catalyst flows from regeneration zone C to the stripping zone through downcomer conduit 76'' at the base of which there is a valve 76a'' for controlling catalyst flow. Aeration steam may be introduced immediately above this valve through line 77''. Aeration steam is introduced through line 78 at a point immediately above the catalyst withdrawal valve 73a and additional stripping steam may be introduced through line 78' at the lower end of the stripping zone.

Cooling coils 79, 79' and 79'' may be mounted in the several regeneration zones. Alternatively, the cooling may be effected in these zones by cooling the introduced catalyst or by recycling the catalyst from a zone through a cooler and back to the regeneration tower.

In regeneration zone A I provide a plurality of cyclone separators 80 which may be connected in parallel, or in series, or both. Gases from the light, dilute or dispersed catalyst phase at the top of the tower enter these cyclones through lines 81. Separated catalyst is returned to the dense phase through dip legs 82. Catalyst-free gases are withdrawn through lines 83 to regeneration gas line 74.

The operation of the structure illustrated in Figure 3 is substantially as follows: Air or a mixture of air with steam or air with flue gas is introduced through line 72 at such a rate that it will have a vertical velocity through the tower of about .5 to 4 feet per second, preferably about 1½ to 2½ feet per second. This air passes upwardly through the perforations in partition wall 75' and partition wall 75. Spent catalyst is introduced into the tower through line 71 at a temperature of about 800 to 950° F. (or at lower or higher temperature) and is maintained in dense turbulent suspended catalyst phase in the upper zone at a temperature above 850° F., for example, 1000° F., for a period of time sufficient to effect the desired extent of regeneration. While starting up it is undesirable to have too high an oxygen concentration in this upper zone and hence an inert gas such as flue gas may be introduced with the air through line 72.

Catalyst is removed from the dense turbulent suspended catalyst phase in the top zone and flows downwardly through downcomer 76 wherein it is maintained in fluent condition by steam or other inert aeration gas introduced through line 77.

When the dense turbulent suspended catalyst phase reaches a desired level in the upper zone A, valve 76a is opened and the catalyst is permitted to flow into the adjacent lower regeneration zone B at the same rate as that at which it is introduced into the top regeneration zone. When the dense turbulent suspended catalyst phase in the lower zone reaches a desired level, valve 76a' is opened and catalyst flows through downcomer 76' into regeneration zone C wherein it is suspended in incoming air. When the dense turbulent suspended catalyst phase in zone C reaches a desired level, valve 76a'' is opened and regenerated catalyst flows downwardly through downcomer 76'' into the stripping zone. Steam from the stripping zone passes upwardly through perforated partition wall 76'' and forms a part of the regeneration gases but the amount of this steam is so small as to have no deleterious effect on the catalyst undergoing regeneration.

From the above description it will be seen that the oxygen concentration is highest in the zone wherein the catalyst is most nearly regenerated. The amount of air necessary for regeneration is considerably reduced in this countercurrent system because zone A effectively utilizes relatively low oxygen concentrations and after the more readily combustible materials have been burned from the catalyst they are subjected to increasing oxygen concentrations. Furthermore, it is less likely in this system for any catalyst particles to leave the regeneration system without having been in the regenerator for a sufficient length of time for effecting adequate regeneration. The average catalyst residence time in each zone may vary from a fraction of a minute to 10 minutes or more depending upon the amount of carbonaceous material that must be burned. In the case of silica-alumina or silica-magnesia cracking catalysts the regeneration temperature is preferably about 950 to 1050° F. although some catalysts will safely withstand higher regeneration temperatures.

When tower 10 is employed for the conversion step regenerated catalyst will be introduced through line 71 and charging stock vapors through line 72, the spent catalyst being withdrawn through conduit 73 and the reaction products passed to the fractionation system through line 74. In this case the incoming charging stock vapors are first contacted with a catalyst which is partially spent and initial over-treating is thus avoided. Regenerated catalyst introduced through line 71 is preferably at a relatively high temperature, i. e., about 950 to 1000° F. and this final contacting of partially converted charging stock with freshly regenerated catalyst at the relatively high temperature brings about maximum conversion to high octane number motor fuel.

The countercurrent system is particularly useful for the catalytic reforming, hydroforming or dehydroaromatization of virgin or paraffinic naphthas by means of group VI metal oxides deposited on activated alumina. In this case the particle size of the catalyst is substantially the same as in the case of catalytic cracking but the composition of the catalyst is quite different. Preferred catalysts for such reforming or dehydroaromatization processes are preferably molybdenum oxide or chromium oxide deposited on activated alumina or incorporated in an alumina gel which is subsequently dried and activated by heating to temperatures of the order of 1000° F. Such reforming reactions require a longer vapor contact time than catalytic cracking reactions. In such reforming reactions it is also more desirable for the catalyst to contact hot hydrocarbon vapors before coming into contact with the hot incoming charging stock vapors—in other words, the catalyst actually undergoes an activation in zone A so that it is most efficient for effecting the desired conversion in zones B and C. Hydrogen may of course be introduced with the charging stock vapors through line 72 and the system may be operated at higher pressures than are usually employed for catalytic cracking. Generally speaking, the hydroforming is effected at about 900 to 1050° F. under pressures ranging from atmospheric to 450 pounds per square inch and the mol ratio of hydrogen employed may range from .5 or less to 8 or 9. The catalyst holding time in such operations may be 50 or 60 times as long as in catalytic cracking processes—in catalytic cracking the catalyst holding time is usually about 5 to 15 minutes while in the naphtha conversion process the catalyst holding time may be 5 to 15 hours.

The systems hereinabove described are characterized by bottom catalyst withdrawal, i. e., catalyst is removed from the bottom of each zone instead of from the top thereof. It is not essential that this draw-off be at the very bottom of the zone but the upper end of the catalyst draw-off should in all cases be below the level of the dense turbulent suspended catalyst phase in said zone. The amount of aeration in the downcomer conduits should be relatively small and suitable baffles or valves may be employed wherever necessary to prevent the up-flowing gases or vapors in the tower from entering the downcomer conduits in too great a quantity.

By withdrawing catalyst from the bottom or from the dense turbulent suspended catalyst phase in each zone it is usually unnecessary to provide any catalyst knock-back means at the top of any zone except the top zone. I may, however, employ cyclone separators at the top of each zone as illustrated in Figures 4, 5 and 6.

Referring to Figure 4, the gases from the top of zone C may be centrifugally introduced into cyclone separators 80' through inlet pipes 81'. Separated catalyst may be returned to the dense phase in zone C through dip legs 82'. The gases will thus leave zone C through lines or openings 83' and they may be introduced into zone B under cone-shaped or cup-shaped caps 84. The function of these caps is to provide a more uniform distribution of the gases or vapors in zone B. The vertical vapor velocity at the base of caps 84 is sufficiently high to prevent the formation of any dense phase at this particular point, the turbulent dense suspended catalyst phase being established above the lower edges of said caps.

Instead of employing the Buell type cyclone separators illustrated in Figure 4 I may, of course, employ multi-cones as illustrated in Figure 6. In this case the gases from the upper part of zone C enter centrifugal separator 80'' and a swirling motion is imparted to these gases in the separator 80' and outlet pipe 83'' by means of vanes 81''. Separated catalyst is returned to the dense phase through dip legs 82'' and the gases are introduced into zone B under caps or distributors 84.

My system may comprise both a reactor and a regenerator of the type illustrated in Figure 3 wherein catalyst is withdrawn from the standpipe at the base of the reactor and introduced into an upper zone of a regenerator and catalyst is withdrawn from the base of the regenerator and introduced into an upper zone in the reactor. It should also be specifically pointed out that the downcomers leading from an upper zone to the adjacent lower zone may be of the type illustrated in Figure 1 wherein a settling zone is interposed between the gas and vapor inlet and the downcomer, or may be of the type illustrated in Figure 3 wherein the upper part of the downcomer is of a higher elevation than the gas or vapor inlet to said zone, or the upper part of the downcomer may be at substantially the same level as the partition between the adjacent zones. In all cases, however, I prefer to withdraw catalyst from the dense turbulent suspended catalyst phase at a point below the upper level of said phase. While I have described specific examples of my invention and specific conditions of operation it should be understood that the invention is not limited to these particular examples since alternative structures and operating conditions will be apparent from the above description to those skilled in the art.

I claim:

1. The method of operating a catalytic conversion system which employs powdered catalyst which method comprises introducing powdered catalyst into a first zone, maintaining a dense turbulent suspended catalyst phase in said first zone by means of gas or vapor which is introduced into said first zone from a second zone, withdrawing catalyst from the dense turbulent suspended catalyst phase in the first zone to a low point in said second zone, maintaining the withdrawn catalyst in aerated condition during its transfer from the first to the second zone, introducing a gas or vapor at a low point in the second zone at such vertical velocity as to maintain a dense turbulent suspended catalyst phase in said second zone, withdrawing catalyst from said second zone at a point below the level of the dense turbulent suspended catalyst phase therein and aerating said last-named catalyst for maintaining it in fluent form.

2. The method of claim 1 which includes the further steps of introducing the last-named withdrawn catalyst into a third zone, introducing gas or vapor at a low point in the third zone at such a rate as to maintain catalyst in said zone in dense phase turbulent suspension, passing gases from the third zone to said second zone and withdrawing catalyst from the dense turbulent suspended catalyst phase in the third zone.

3. The method of claim 1 which includes the further steps of mechanically separating catalyst particles from gases or vapors leaving said second zone before said gases or vapors are introduced into said first zone and returning the separated catalyst to the dense turbulent suspended catalyst phase in said second zone.

4. A countercurrent contacting system for powdered catalyst which system comprises a vertical tower, a partition wall in said tower for dividing it into an upper and lower zone respectively, said partition being provided with at least one opening through which gases or vapors may be passed from the lower zone to the upper zone, a downcomer conduit for conveying catalyst from the upper zone to a low point in the lower zone out of contact with gases or vapors passing from the lower zone to the upper zone through said opening, means for introducing powdered catalyst into the upper zone, means for introducing a gas or vapor at a low point in the lower zone to first maintain a dense turbulent suspended catalyst phase in the lower zone and then to pass through said opening for maintaining a dense turbulent suspended catalyst phase in the upper zone, means for withdrawing gases or vapors from the top of the upper zone and for recovering catalyst from the withdrawn gases or vapors, means for withdrawing catalyst from the lower zone and means for aerating the withdrawn catalyst.

5. The system of claim 4 which includes distributing means at the base of the upper zone for distributing gases or vapors introduced thereto from the lower zone.

6. The system of claim 4 which includes mechanical means for separating catalyst from gases or vapors leaving the lower zone, means for returning the separated catalyst to the dense turbulent suspended catalyst phase in the lower zone and means for distributing the gases from the lower zone at the base of the upper zone.

7. The system of claim 4 which includes means in said downcomer conduit for controlling the flow of catalyst therethrough and means for aerating the catalyst in said downcomer conduit.

8. The method of operating a countercurrent powdered catalyst system which comprises continuously introducing powdered catalyst into a first zone, continuously introducing gas or vapor from a second zone at the base of said first zone at such a rate as to maintain the introduced catalyst in dense turbulent suspended catalyst phase, regulating the level of the dense turbulent suspended catalyst phase in the first zone by withdrawing catalyst therefrom at substantially the same rate as it is introduced thereto, maintaining the catalyst withdrawn from the dense turbulent suspended catalyst phase in the first zone in aerated condition and introducing the aerated catalyst at a low point in the second zone, introducing a gas or vapor at the base of the second zone at such a rate as to maintain a dense turbulent suspended catalyst phase in said zone, regulating the level of said dense turbulent suspended catalyst phase by withdrawing catalyst therefrom at substantially the same rate as catalyst is added thereto, and aerating the catalyst withdrawn from the second dense turbulent suspended catalyst phase to maintain it in fluent condition.

9. The method of claim 8 wherein the catalyst introduced into the first zone is regenerated catalyst and wherein the gas or vapor introduced at the base of the second zone is a hydrocarbon gas or vapor.

10. The method of claim 8 wherein spent catalyst is introduced into the first zone and oxygen-containing gas is introduced at the base of the second zone.

11. The method of claim 8 wherein a regenerated catalyst is introduced into the first zone, said catalyst comprising silica and a metal oxide of the class consisting of alumina and magnesia, wherein gas oil vapors are introduced at the bottom of the second zone.

12. The method of claim 8 wherein regenerated catalyst is introduced into the first zone said catalyst comprising activated alumina and a group VI metal oxide deposited thereon and wherein naphtha vapors are introduced at the bottom of the second zone.

13. The method of claim 8 which includes the further steps of mechanically separating catalyst from gases or vapors in the upper part of the second zone, returning separated catalyst to the dense turbulent suspended catalyst phase in the second zone and distributing the gases or vapors thus freed from catalyst at the bottom of the first zone.

14. The method of claim 8 wherein the catalyst withdrawn from the first zone and introduced into the second zone is transferred directly from the dense phase of the first zone to the dense phase of the second zone.

15. The method of countercurrently contacting a finely divided solid with a gas or vapor which method comprises introducing finely divided solids into a first contacting zone, introducing a gas or vapor from a second contacting zone to a low point in the first contacting zone for maintaining a suspension of solids in said first contacting zone, withdrawing a confined stream of solids from said suspension in said first contacting zone and introducing said confined stream at a low point in said second contacting zone, introducing a gas or vapor at a low point in the second contacting zone for suspending solids introduced thereto from said confined stream, downwardly withdrawing a confined stream of finely divided solids from the second contacting zone and withdrawing from the upper part of the first contacting zone the gas or vapor which was introduced at a low point in the second contacting zone and then passed through the first contacting zone.

16. A catalytic conversion system which comprises a regenerator, means for separating said regenerator into an upper and lower zone respectively, means for withdrawing regenerated catalyst downwardly from the lower zone, means for introducing primary regeneration air at the lower part of the lower regeneration zone but at a higher point than the regenerated catalyst draw-off, means for introducing regeneration gas from the lower regeneration zone to the upper regeneration zone, means for introducing spent catalyst into said upper regeneration zone, means for passing catalyst from the bottom of the upper regeneration zone to the lower regeneration zone, means for withdrawing regeneration gases from the top of the upper regeneration zone, means for separating catalyst from the withdrawn regeneration gases and means for returning the separated catalyst to the lower regeneration zone.

17. The apparatus defined by claim 16 which includes a hopper at the base of the upper regeneration zone, a conduit for introducing catalyst from said hopper to the lower part of the lower regeneration zone above the point at which air is introduced into the lower regeneration zone and a conduit for introducing regeneration gases from the lower regeneration zone to the upper regeneration zone.

18. The apparatus of claim 16 which includes means for removing heat from the lower regeneration zone.

19. The method of regenerating a finely divided solid catalyst which has become coated with carbonaceous deposits which method comprises suspending said catalyst in a gas of relatively low oxygen content in a first up-flow regeneration zone, maintaining a vertical gas velocity in said zone at such a rate as to maintain a dense turbulent phase of suspended catalyst in said zone, continuously settling catalyst from said turbulent suspension, resuspending said settled catalyst in a regeneration gas of higher oxygen concentration in a second up-flow regeneration zone, introducing gases from the top of said second regeneration zone to a lower part of the first regeneration zone and withdrawing regenerated catalyst from said second regeneration zone.

20. A regeneration system which comprises a vertical tower, at least one inclined partition wall in said tower dividing it into an upper section and at least one lower section, said inclined partition forming a hopper in said upper section, a hopper bottom in the lower section of said tower, a conduit leading from the lower part of the hopper in the upper section to a lower part of the lower section of the tower, a conduit for withdrawing material from the lower part of the lower section of the tower, means for upwardly introducing air into the lower section of the tower at the lower end of the conduit leading from the lower part of the upper section of the tower, a conduit for connecting the upper part of the lower section of the tower with the lower part of the upper section of the tower, separate means for introducing suspended solids into the upper section of the tower in such a manner that they may be suspended in the upper section of the tower by gases introduced through said last named conduit, means for withdrawing gases from the upper part of the upper section of said tower, means for separating catalyst from said gases and means for returning said separated catalyst to the system.

21. In a hydrocarbon conversion system wherein conversion is effected in an upflow reactor, catalyst is separated from conversion products, regenerated in an upflow regenerator and then returned to the reactor, the method of operation which comprises introducing spent catalyst together with an oxygen-containing gas at an intermediate part of the regenerator at such a rate that a dense phase of suspended catalyst is maintained above this point of oxygen introduction, introducing a further quantity of oxygen-containing gas at a lower point in the regenerator and downwardly withdrawing catalyst from a low point in the regenerator whereby catalyst which settles from the upper part of the regenerator to the point of withdrawal must pass through the zone into which additional oxygen-containing gas is introduced.

22. The method of regenerating a finely divided solid contact material which has become coated with carbonaceous deposits which method comprises introducing said coated contact material into a zone of low oxygen concentration, maintaining a dense turbulent suspended solids phase in said zone by passing regeneration gases upwardly therein at low vertical velocity, removing powdered solids from the upwardly flowing regeneration gases into an accumulation zone which is out of contact with said upwardly flowing regeneration gases, introducing removed solids downwardly from the accumulation zone into a zone of higher oxygen concentration, passing an oxygen-containing gas of relatively high oxygen concentration upwardly in said last-named zone at such velocity as to maintain catalyst in dense phase turbulent suspension therein, removing catalyst from said last-named dense phase turbulent suspension into a second accumulation zone and aerating the accumulated solids in said second accumulation zone.

EVERETT A. JOHNSON.